(12) United States Patent
Lee

(10) Patent No.: US 7,790,313 B2
(45) Date of Patent: Sep. 7, 2010

(54) SECONDARY BATTERY

(75) Inventor: Sang-Won Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 846 days.

(21) Appl. No.: 11/179,307

(22) Filed: Jul. 11, 2005

(65) Prior Publication Data
US 2006/0024578 A1    Feb. 2, 2006

(30) Foreign Application Priority Data
Jul. 28, 2004    (KR) .................... 10-2004-0059203

(51) Int. Cl.
*H01M 10/16*    (2006.01)

(52) U.S. Cl. .................................................. 429/208

(58) Field of Classification Search ................ 429/208, 429/161, 180, 94
See application file for complete search history.

(56) References Cited

U.S. PATENT DOCUMENTS

| 5,922,484 | A |   | 7/1999 | Frazier |
| 6,083,640 | A | * | 7/2000 | Lee et al. ................. 429/94 |
| 6,472,097 | B1 |   | 10/2002 | Ohbayashi et al. |
| 6,893,753 | B2 |   | 5/2005 | Iwaizono et al. |
| 2003/0129479 | A1 |   | 7/2003 | Munenaga et al. |
| 2004/0191612 | A1 | * | 9/2004 | Akita et al. ................. 429/94 |
| 2005/0214642 | A1 | * | 9/2005 | Kim et al. .................. 429/211 |

FOREIGN PATENT DOCUMENTS

| CN | 1271984 A |   | 11/2000 |
| JP | 2000-40501 |   | 2/2000 |
| JP | 2000150306 | * | 5/2000 |
| JP | 2000040501 | * | 8/2000 |
| JP | 2001-38475 |   | 2/2001 |
| JP | 2001-273931 |   | 10/2001 |
| JP | 2002-231297 |   | 8/2002 |
| JP | 2004-030946 |   | 1/2004 |
| KR | 1019990068891 A |   | 9/1999 |

(Continued)

OTHER PUBLICATIONS

Patent Abstracts of Japan, Publication No. 2000-040501, Publication Date Feb. 8, 2000, in the name of Itagaki et al.

(Continued)

*Primary Examiner*—Patrick Ryan
*Assistant Examiner*—Muhammad Siddiquee
(74) *Attorney, Agent, or Firm*—Christie, Parker & Hale, LLP

(57) ABSTRACT

A secondary battery comprising an electrode assembly having a positive electrode plate, a negative electrode plate, and a separator between the positive and negative electrodes is provided. The secondary battery further comprises a case for containing the electrode assembly, and a cap assembly connected to the case. The cap assembly comprises positive and negative terminals electrically connected to the positive electrode plate and the negative electrode plate, respectively. Lead connectors are electrically connected to the positive and negative electrode plates and the positive and negative terminals. A support is connected to each end of the electrode assembly and surrounds the lead connectors. The supports are adapted to fit between the electrode assembly and the case.

21 Claims, 4 Drawing Sheets

FOREIGN PATENT DOCUMENTS

KR    1020040058915 A    7/2004

OTHER PUBLICATIONS

Patent Abstracts of Japan, Publication No. 2001-038475, Publication Date Feb. 13, 2001, in the name of Shimoda et al.

Patent Abstracts of Japan, Publication No. JP 2004-030946, dated Jan. 29, 2004, in the name of Hiroshi Arakawa.

Korean Patent Abstracts, Publication No. KR 1019990068891 A, dated Sep. 6, 1999, in the name of Hankook Tire Co., Ltd.

Korean Patent Abstracts, Publication No. KR 1020040058915 A, dated Jul. 5, 2004, in the name of Eon Sik Park.

Patent Abstracts of Japan, Publication No. 2002-231297, dated Aug. 16, 2002, in the name of Takeyoshi Munenaga et al.

U.S. Office action dated May 14, 2008, for related U.S. Appl. No. 11/190,380, noting U.S. Patent 5,922,484 and U.S. Publication 2003/0129479 listed in this IDS.

U.S. Office action dated Dec. 1, 2008, for related U.S. Appl. No. 11/190,380, noting U.S. Patent 6,893,753 listed in this IDS.

U.S. Office action dated Apr. 30, 2009, for related U.S. Appl. No. 11/190,380, noting JP 2000-150306 previously cited in U.S. Office action dated Dec. 8, 2008.

\* cited by examiner

SECONDARY BATTERY

CROSS REFERENCE TO RELATED APPLICATION

This application claims priority to and the benefit of Korean Patent Application No. 10-2004-0059203 filed Jul. 28, 2004 in the Korean Intellectual Property Office, the entire content of which is incorporated herein by reference.

FIELD OF THE INVENTION

The present invention relates to a secondary battery, and more particularly, to a technique for protecting an electrical connection of the secondary battery.

BACKGROUND OF THE INVENTION

Unlike primary batteries which cannot be recharged, secondary batteries can be repeatedly charged and discharged. Low capacity batteries that use single battery cells are used as power sources for various portable electronic devices such as cellular phones, notebook computers, and camcorders. High power batteries that use tens of battery cells connected to each other in a battery pack are used as power sources for hybrid electric vehicles (HEV).

Secondary batteries are classified according to their external shape into cylinders, prisms, or pouches.

Secondary batteries generally include an electrode assembly which is formed by spirally winding positive and negative electrodes and a separator into a jelly-roll shape. The separator is positioned between the positive and negative electrodes and serves as an insulator. The electrode assembly may alternatively be formed by stacking a positive plate, a negative plate and a separator in a case, and closing the case with a cap assembly. The cap assembly has an external terminal.

The structure of an electrode assembly of a prismatic secondary battery is described in Japanese Unexamined Patent Application Publication Nos. 2000-40501, and 2001-38475, the entire contents of which are incorporated herein by reference.

However, in such a prismatic secondary battery, the electrical connection between the electrode assembly and the external terminal is weak and can be damaged by external impact. The connection is weak because the lead connector connected to the external terminal is welded to an uncoated region of the electrode assembly and positioned in the case without protection.

A secondary battery for a hybrid electric vehicle must have a stable connection in order to output high power. However, when the above described secondary battery is exposed to an external impact such as vibration, a stable connection is difficult to manufacture.

SUMMARY OF THE INVENTION

In one embodiment of the present invention, a secondary battery capable of preventing a reduction in durability due to external impact is provided.

According to one embodiment of the present invention, a secondary battery comprises an electrode assembly comprising a positive electrode, a negative electrode, and a separator positioned between the positive and negative electrodes. The electrode assembly is inserted in a case and a cap assembly is connected to the case. The cap assembly has terminals electrically connected to the positive and negative electrodes. A lead connector is electrically connected to either the positive electrode or the negative electrode and the terminals of the cap assembly. The secondary battery further comprises first and second supports connected to the electrode assembly which surround the lead connector and are disposed between the electrode assembly and the case.

The first and second supports may be sized to correspond to a gap between the electrode assembly and the case. The first and second supports may be connected to the electrode assembly by mounting them onto each of the uncoated regions of the positive and negative electrodes. The first and second supports may take any shape suitable to receive the uncoated regions of the positive and negative electrodes. In one embodiment, the first and second supports comprise grooves corresponding in size and shape to the uncoated regions of the positive and negative electrodes. The grooves are positioned on a surface of the first and second supports facing the uncoated regions of the positive and negative electrodes. The grooves may comprise slots in which terminals electrically connected to the uncoated regions are inserted. Each groove may further comprise a terminal insertion slot at its front end into which the terminal is fitted. The first and second supports may comprise insulative materials and may comprise a plurality of through-holes.

BRIEF DESCRIPTION OF THE DRAWINGS

The above and other features and advantages of the present invention will become more apparent by reference to the following detailed description when considered in conjunction with the accompanying drawings, in which.

DETAILED DESCRIPTION

Figure 1:
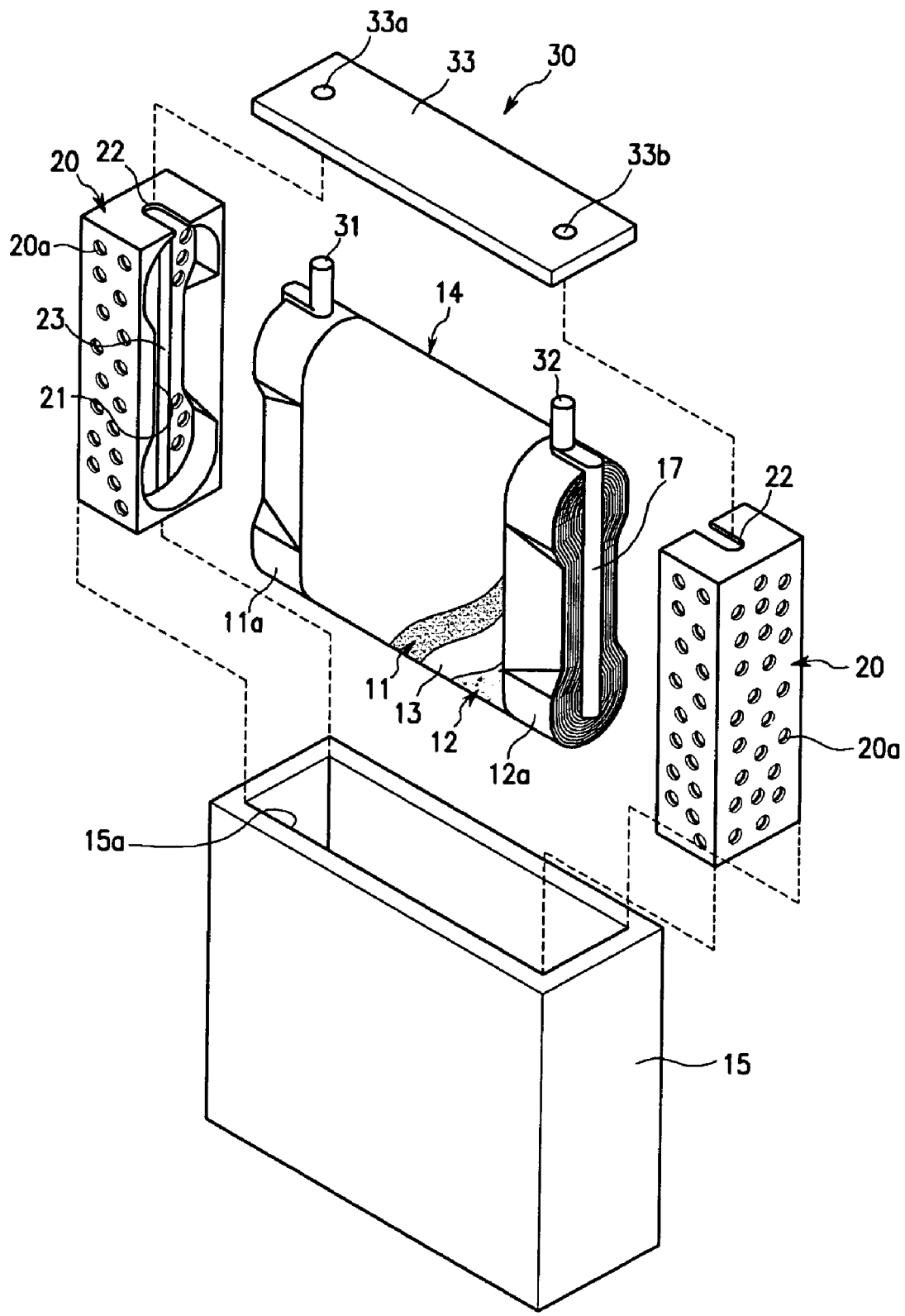
FIG. 1 is a schematic perspective view of a secondary battery according to one embodiment of the present invention.
Figure 2:
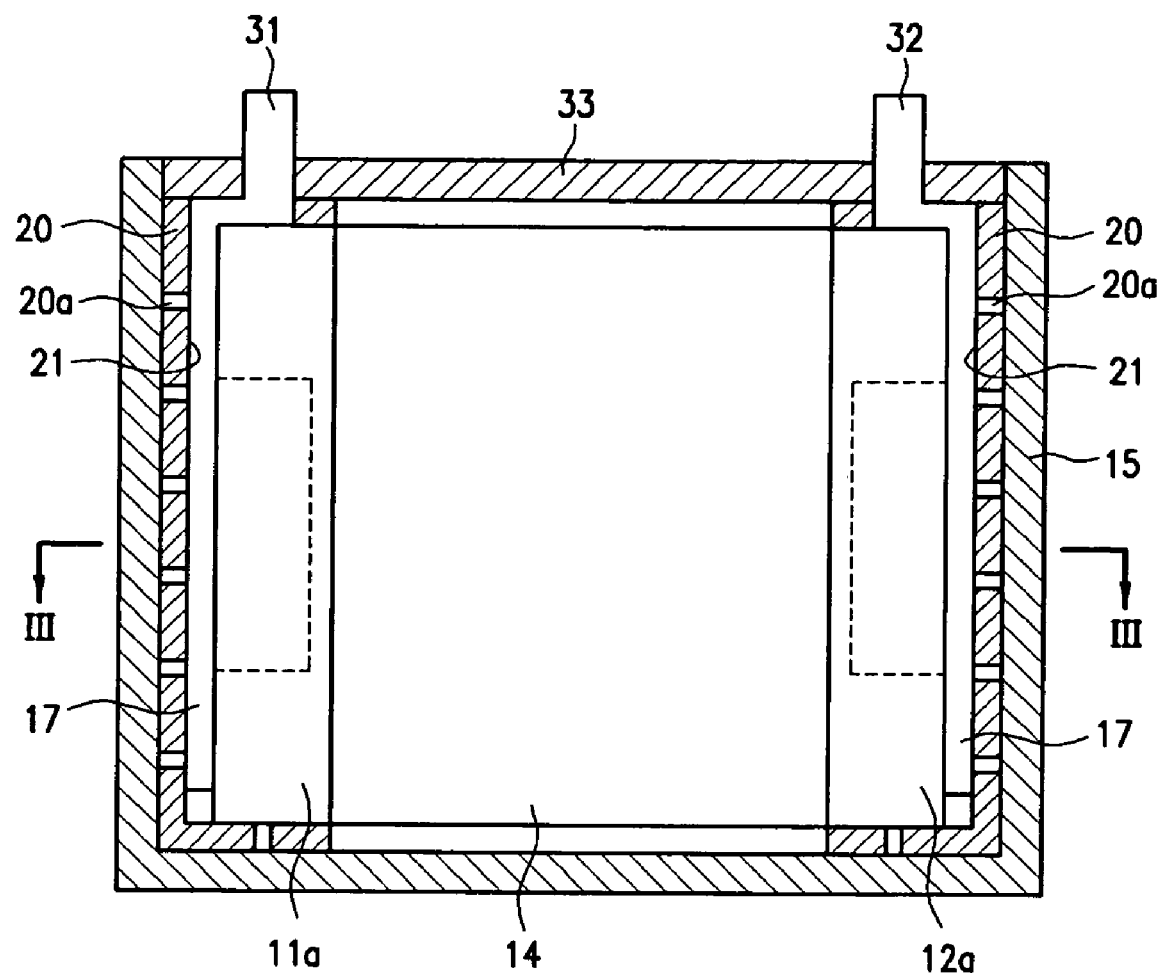
FIG. 2 is a cross-sectional view of the secondary battery of FIG. 1.
Figure 3:
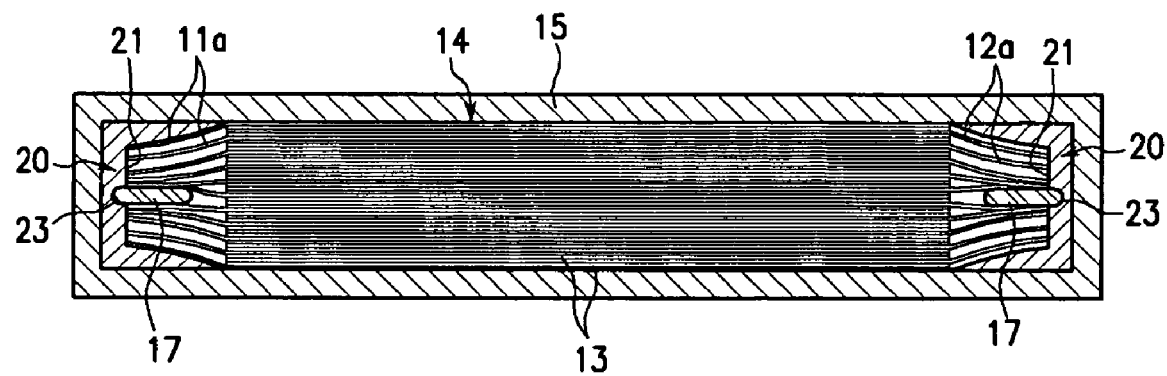
FIG. 3 is a cross-sectional view of the secondary battery of FIG. 2, taken along line III-III.
Figure 4:
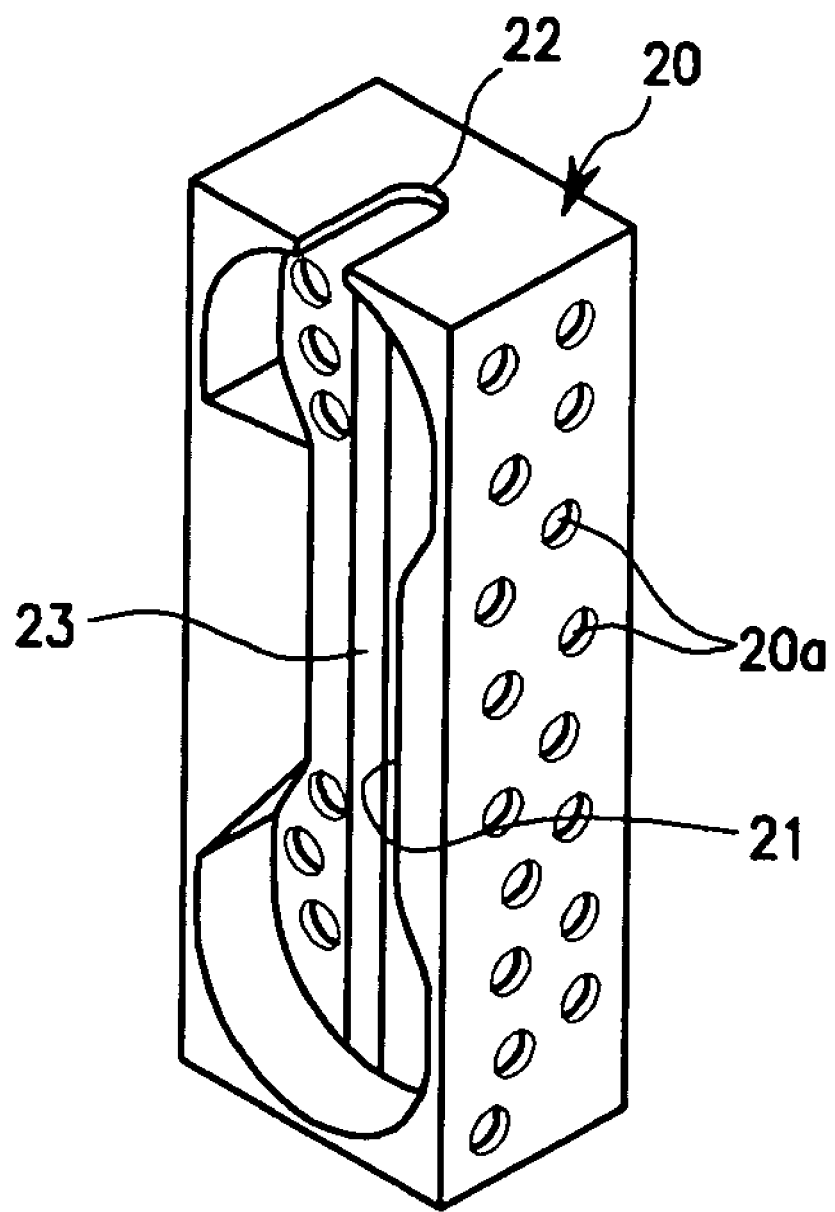
FIG. 4 is a perspective view of an inner casing according to one embodiment of the present invention.

Exemplary embodiments of the present invention will now be described in detail with reference to the accompanying drawings. FIG. 1 is a schematic perspective view of the construction of a secondary battery according to one embodiment of the present invention. FIG. 2 is a cross-sectional view of the battery of FIG. 1, illustrating the connected state of the secondary battery. FIG. 3 is a cross-sectional view of the battery of FIG. 2, taken along line III-III.

Referring to FIGS. 1, 2 and 3, a secondary battery according to one embodiment of the present invention comprises an electrode assembly 14 comprising a positive electrode plate 11, a negative electrode plate 12 and a separator 13 positioned between the positive and negative electrode plates 11 and 12, respectively. The positive and negative electrode plates 11 and 12, respectively, and the separator 13 are spirally wound together in a jelly-roll shape to form the electrode assembly 14. The electrode assembly 14 is placed in a box-shaped case 15, and the case 15 is closed with a cap assembly 30. The cap assembly 30 is coupled to an opening 15*a* of the case 15, thereby sealing the case. The cap assembly 30 further comprises a positive electrode terminal 31 and a negative electrode terminal 32 electrically connected to uncoated regions 11*a* and 12*a* of the positive electrode plate 11 and negative electrode plate 12, respectively. The uncoated regions 11*a* and 12*a* are regions of the positive electrode plate 11 and negative electrode plate 12 that are not coated with an active material. The positive and negative electrode terminals 31 and 32, respectively, are connected to the positive and negative electrode plates 11 and 12, respectively, by lead connectors 17. First and second supports 20 are connected to the electrode assembly 14 and are positioned between the case 15 and the uncoated regions 11a and 12a of the electrode assembly 14.

The case 15 comprises a conductive metal such as aluminum, an aluminum alloy, or nickel-plated steel. The case 15 may take any desired shape that defines an inner space for receiving the electrode assembly 14. For example, the case may be hexagonal or cylindrical.

In one embodiment, the electrode assembly 14 comprises a layered structure wherein the separator 13 is positioned between the positive electrode plate 11 and the negative electrode plate 12. Alternatively, the electrode assembly 14 comprises a jelly-roll structure wherein the positive electrode plate, negative electrode plate, and separator are sequentially stacked and spirally wound. In either embodiment, the positive and negative electrode plates comprise current collectors coated with active materials.

According to one embodiment of the present embodiment, a secondary battery is formed by inserting a jelly-roll shaped electrode assembly 14 in a prismatic case 15. In this embodiment, the separator 13 is positioned between the positive and negative electrode plates 11 and 12, respectively, and the electrode assembly 14 is spirally wound to a jelly-roll shape. As noted above, the positive and negative electrode plates 11 and 12, respectively, comprise current collectors coated with active materials. Furthermore, the wound electrode assembly 14 takes a cylindrical shape, but is pressed to a generally square shape. After pressing the electrode assembly 14, the uncoated region 11a on the positive electrode plate 11 and the uncoated region 12a on the negative electrode plate are positioned opposite each other toward the outside of the separator 13.

In this configuration, the positive terminal 31 is connected to the uncoated region 11a on the edge of the positive electrode plate 11, and the negative terminal 32 is connected to the uncoated region 12a on the edge of the negative electrode plate 12. As noted above, the uncoated regions 11a and 12a on the positive electrode plate 11 and negative electrode plate 12, respectively, comprise regions of the positive and negative electrode plates 11 and 12, respectively, that are not coated with active materials. The positive terminal 31 and negative terminal 32 are connected to the uncoated regions 11a and 12a, respectively, by lead connectors 17. Specifically, the positive and negative terminals 31 and 32, respectively, are mounted to the front ends of the lead connectors 17, and the lead connectors 17 are welded to the uncoated regions 11a and 12a of the positive and negative electrode plates 11 and 12, respectively.

After winding, the electrode assembly 14, including the uncoated regions 11a and 12a of the positive and negative electrode plates 11 and 12, respectively, remains in its multilayered state. After inserting the lead connectors 17 in the uncoated regions 11a and 12a, at least a portion of each uncoated region 11a and 12a is coupled to the lead connector 17. The uncoated regions 11a and 12a may be coupled to the lead connectors 17 by any suitable means, for example, by pinching a portion of each region to the lead connectors 17. Any portion of the uncoated regions 11a and 12a may be coupled to the lead connectors 17. For example, the center regions of the uncoated regions 11a and 12a can be pinched together to connect them to the lead connectors 17, as shown in FIG. 1. In this configuration, the center regions of the uncoated regions 11a and 12a are thinner than the unpinched portions of the uncoated regions 11a and 12a, forming a generally dumbbell shape when seen from the side of the electrode assembly 14. Although shown in a generally dumbbell shape, it is understood that the uncoated regions 11a and 12a may take any shape such that they are contoured to fit within the supports 20.

The cap assembly 30 comprises a cap plate 33 coupled in an air-tight manner to an opening 15a in the top of the case 15. The cap plate 33 comprises holes 33a and 33b on either side for inserting the positive terminal 31 and the negative terminal 32.

The lead connectors 17 may comprise any suitable structure. In one embodiment, a portion of each lead connector 17 is welded to the uncoated regions 11a and 12a to connect the uncoated regions 11a and 12a. The remaining portion of the lead connector 17 is exposed along the length of the uncoated regions 11a and 12a.

The supports 20 are sized and shaped to fit the uncoated regions 11a and 12a, and are disposed within the case 15 between the uncoated regions 11a and 12a and the case 15 when the electrode assembly 14 is in the case 15. In this embodiment, the supports 20 are contoured to receive the uncoated regions 11a and 12a of the electrode assembly 14 and are adapted to fit in the opening 15a of the case 15 when mounted to the electrode assembly 14.

In one embodiment, the supports 20 comprise grooves 21 for containing the uncoated regions 11a and 12a. The grooves 21 are located on surfaces of the supports 20 facing the uncoated regions 11a and 12a. The grooves 21 may comprise slots 23 sized and shaped to receive the lead connectors 17. Each slot 23 extends the length of each groove 21.

In sum, the grooves 21 are contoured to receive the uncoated regions 11a and 12a. In one embodiment, however, the grooves 21 each take a generally dumbbell shape such that the center region of each groove 21 is thinner than the rest of the groove 21.

The supports 20 may comprise an insulative material so as not to affect the performance of the secondary battery. Non-limiting examples of suitable insulative materials include plastics such as polyimide, or composites of powered diamond and plastic.

Further, the supports 20 may comprise a plurality of through-holes 20a for venting heat generated in the case 15 or for venting gas generated due to pressure.

To insert the electrode assembly 14 into the case, the uncoated regions 11a and 12a are first inserted into the supports 20. In one embodiment, the uncoated regions 11a and 12a are inserted into the supports by inserting the uncoated regions 11a and 12a into the grooves 21 and inserting the lead connectors 17 into the slots 23. In this configuration, the supports 20 completely surround the uncoated regions 11a and 12a.

The supports 20 may further comprise terminal insertion slots 22 on their top surfaces. When the supports 20 are mounted on the uncoated regions 11a and 12a, the positive and negative terminals 31 and 32, respectively, are inserted into the terminal insertion slots 22.

When the electrode assembly 14, including the mounted supports 20, is inserted in the case 15, the supports 20 protect the uncoated regions 11a and 12a of the electrode assembly 14, thereby preventing damage to the secondary battery upon external impact.

Further, in this embodiment, the supports 20 are positioned between the electrode assembly 14 and the case 15, thereby efficiently using the inner space of the case 15 of the secondary battery.

As discussed above, the secondary battery according to one embodiment of the present invention comprises uncoated regions 11a and 12a of the electrode assembly surrounded by supports 20 having predetermined shapes. This configuration protects the battery from damage caused by external impact. The supports 20 according to the present invention, therefore prevent breakdown of the uncoated regions 11a and 12a caused by external impact energy, thereby preventing disconnection of the uncoated regions 11a and 12a from the lead connectors 17. As a result, battery durability is improved.

Further, in one embodiment of the present invention, supports disposed between the electrode assembly and the case minimize the gap between the electrode assembly and the case, thereby preventing injection of the electrolyte into the gap. This configuration minimizes the electrolyte material needed, and prevents battery performance reduction that may occur from excessive electrolyte injection.

The secondary batteries of the present invention are useful as power sources for high power electric devices driven by motors, such as electric vehicles, hybrid electric vehicles, wireless vacuum cleaners, motorbikes, motor scooters, and the like.

Although exemplary embodiments of the present invention have been described, those skilled in the art will understand that various modifications and variations can be made without departing from the spirit and scope of the present invention as disclosed in the accompanying claims.

What is claimed is:

1. A secondary battery comprising:
   an electrode assembly comprising:
      a first end and a second end facing away from the first end, each of the first and second ends comprising a narrow center portion,
      a positive electrode plate,
      a negative electrode plate, and
      a separator positioned between the positive and negative electrode plates;
   a first lead connector extending through and electrically connected to the narrow center portion of the first end of the electrode assembly;
   a second lead connector extending through and electrically connected to the narrow center portion of the second end of the electrode assembly;
   a first support mounted to the first end of the electrode assembly, the first support comprising a first groove adapted to receive the first end of the electrode assembly, the first groove having two enlarged ends and a first channel connecting the two enlarged ends and a second support mounted to the second end of the electrode assembly, the second support comprising a second groove adapted to receive the second end of the electrode assembly, the second groove having two enlarged ends and a second channel connecting the two enlarged ends, the first and second supports each comprising an insulative material selected from the group consisting of polyimide, composites of powdered diamond and plastic, and combinations thereof.

2. The secondary battery of claim 1, further comprising:
   a case for containing the electrode assembly;
   a cap assembly connected to the case, the cap assembly comprising a positive terminal electrically connected to the positive electrode plate, and a negative terminal electrically connected to the negative electrode plate;
   the first lead connector electrically connected to the positive electrode and positive terminal,
   the second lead connector electrically connected to the negative electrode and negative terminal, wherein the first support surrounds one of the first and second lead connectors, and
   the second support surrounds the other of the first and second lead connectors.

3. The secondary battery of claim 1, wherein the electrode assembly and first and second supports are sized and shaped to fit in the case.

4. A secondary battery comprising:
   an electrode assembly comprising:
      a first end and a second end facing away from the first end, each of the first and second ends comprising a narrow center portion,
      a positive electrode plate,
      a negative electrode plate, and
      a separator positioned between the positive and negative electrode plates;
   a first support mounted to the first end of the electrode assembly, the first support being contoured to receive the first end of the electrode assembly and a second support mounted to the second end of the electrode assembly, the second support being contoured to receive the second end of the electrode assembly, the first and second supports each comprising an insulative material selected from the group consisting of polyimide, composites of powdered diamond and plastic, and combinations thereof;
   a case for containing the electrode assembly;
   a cap assembly connected to the case, the cap assembly comprising a positive terminal electrically connected to the positive electrode plate, and a negative terminal electrically connected to the negative electrode plate;
   a first lead connector extending through and electrically connected to the narrow center portion of the first end of the electrode assembly, and electrically connected to the positive electrode and positive terminal;
   a second lead connector extending through and electrically connected to the narrow center portion of the second end of the electrode assembly, and electrically connected to the negative electrode and negative terminal, wherein the first support surrounds one of the first and second lead connectors and the second support surrounds the other of the first and second lead connectors;
   a portion of the positive electrode plate is coated with a positive active material, the positive electrode comprising a first uncoated region that is not coated with the positive active material; and
   a portion of the negative electrode plate is coated with a negative active material, the negative electrode comprising a second uncoated region that is not coated with the negative active material, wherein the first support is mounted on one of the first and second uncoated regions, and the second support is mounted on the other of the first and second uncoated regions.

5. The secondary battery of claim 4, wherein the first support comprises a first groove adapted to receive one of the first and second uncoated regions, and the second support comprises a second groove adapted to receive the other of the first and second uncoated regions.

6. The secondary battery of claim 5, wherein the first groove further comprises a first slot adapted to receive one of the first and second lead connectors, and the second groove further comprises a second slot adapted to receive the other of the first and second lead connectors.

7. The secondary battery of claim 5, wherein the first support further comprises a first terminal insertion slot adapted to receive one of the positive and negative terminals, and the second support further comprises a second terminal insertion slot adapted to receive the other of the positive and negative terminals.

8. The secondary battery of claim 1, wherein the first and second supports each comprise a plurality of through-holes.

9. The secondary battery of claim 1, wherein the electrode assembly has a jelly-roll shape.

10. The secondary battery of claim 1, wherein the secondary battery has a prismatic shape.

11. The secondary battery of claim 1, wherein the secondary battery is adapted for use with a motor driven device.

12. A secondary battery comprising:
an electrode assembly comprising:
a first end and a second end facing the first end, each of the first and second ends comprising a narrow center portion,
a positive electrode plate,
a negative electrode plate, and
a separator positioned between the positive and negative electrode plates;
a first support mounted to the first end of the electrode assembly,
the first support having a first groove extended along a longitudinal axis and adapted to receive the first end of the electrode assembly and a second support mounted to the second end of the electrode assembly, the second support having a second groove extended along a longitudinal axis and adapted to receive the second end of the electrode assembly, the first and second supports each comprising an insulative material selected from the group consisting of polyimide, composites of powdered diamond and plastic, and combinations thereof;
a case for containing the electrode assembly;
a cap assembly connected to the case, the cap assembly comprising a positive terminal electrically connected to the positive electrode plate, and a negative terminal electrically connected to the negative electrode plate;
a first lead connector extending parallel to the longitudinal axis and through the narrow center portion of the first end of the electrode assembly, and electrically connected to the narrow center portion of the first end of the electrode assembly and the positive electrode plate and positive terminal; and
a second lead connector extending parallel to the longitudinal axis and through the narrow center portion of the second end of the electrode assembly, and electrically connected to the narrow center portion of the first end of the electrode assembly and the negative electrode plate and negative terminal, wherein the first support covers one of the first and second lead connectors and the second support covers the other of the first and second lead connectors.

13. The secondary battery of claim 12, wherein the electrode assembly and first and second supports are sized and shaped to fit in the case.

14. A secondary battery comprising
an electrode assembly comprising:
a first end and a second end facing away from the first end, the first and second ends comprising a narrow center portion,
a positive electrode plate,
a negative electrode plate, and
a separator positioned between the positive and negative electrode plates;

a first support mounted to the first end of the electrode assembly, the first support being contoured to receive the first end of the electrode assembly and a second support mounted to the second end of the electrode assembly, the second support being contoured to receive the second end of the electrode assembly, the first and second supports each comprising an insulative material selected from the group consisting of polyimide, composites of powdered diamond and plastic, and combinations thereof;
a case for containing the electrode assembly;
a cap assembly connected to the case, the cap assembly comprising a positive terminal electrically connected to the positive electrode plate, and a negative terminal electrically connected to the negative electrode plate;
a first lead connector extending through and electrically connected to the narrow center portion of the first end of the electrode assembly, and electrically connected to the positive electrode plate and positive terminal;
a second lead connector extending through and electrically connected to the narrow center portion of the second end of the electrode assembly, and electrically connected to the negative electrode plate and negative terminal, wherein the first support surrounds one of the first and second lead connectors and the second support surrounds the other of the first and second lead connectors;
a portion of the positive electrode plate is coated with a positive active material, the positive electrode plate comprising a first uncoated region that is not coated with the positive active material; and
a portion of the negative electrode plate is coated with a negative active material, the negative electrode plate comprising a second uncoated region that is not coated with the negative active material, wherein the first support is mounted on one of the first and second uncoated regions, and the second support is mounted on the other of the first and second uncoated regions.

15. The secondary battery of claim 14, wherein the first support comprises a first groove adapted to receive one of the first and second uncoated regions, and the second support comprises a second groove adapted to receive the other of the first and second uncoated regions.

16. The secondary battery of claim 15, wherein the first groove further comprises a first slot adapted to receive one of the first and second lead connectors, and the second groove further comprises a second slot adapted to receive the other of the first and second lead connectors.

17. The secondary battery of claim 15, wherein the first support further comprises a first terminal insertion slot adapted to receive one of the positive and negative terminals, and the second support further comprises a second terminal insertion slot adapted to receive the other of the positive and negative terminals.

18. The secondary battery of claim 12, wherein the first and second supports each comprise a plurality of through-holes.

19. The secondary battery of claim 12, wherein the electrode assembly has a jelly-roll shape.

20. The secondary battery of claim 12, wherein the secondary battery has a prismatic shape.

21. The secondary battery of claim 12, wherein the secondary battery is adapted for use with a motor driven device.

* * * * *